(12) United States Patent
Seip et al.

(10) Patent No.: US 6,314,380 B1
(45) Date of Patent: Nov. 6, 2001

(54) ULTRASOUND TRANSDUCER TEMPERATURE COMPENSATION METHODS, APPARATUS AND PROGRAMS

(75) Inventors: Ralf Seip, Oxford; Russell C. Watts, Ann Arbor, both of MI (US)

(73) Assignee: Robert Bosch Corporation Corp of Delaware, Farmington Hills, MI (US)

(*) Notice: Subject to any disclaimer, the term of this patent is extended or adjusted under 35 U.S.C. 154(b) by 0 days.

(21) Appl. No.: 09/325,242

(22) Filed: Jun. 3, 1999

(51) Int. Cl.[7] .................................................. G01K 15/00
(52) U.S. Cl. .............................. 702/99; 702/58; 702/71; 702/119; 702/FOR 134; 73/602; 73/629; 73/631; 73/632; 280/735; 378/98; 324/76.23; 324/76.33; 324/77.11; 600/399; 600/400; 600/405; 600/437; 701/47
(58) Field of Search ................................ 702/58, 71, 99, 702/119, FOR 134; 280/735; 378/98; 600/399, 400, 405, 404, 437; 701/47; 324/76.23, 76.33, 77.11; 73/602, 629, 631, 632

(56) References Cited

U.S. PATENT DOCUMENTS

| | | | |
|---|---|---|---|
| 4,976,148 | * 12/1990 | Migliori et al. | 73/579 |
| 5,477,858 | * 12/1995 | Norris et al. | 128/660.05 |
| 6,026,340 | * 2/2000 | Corrado et al. | 701/47 |

* cited by examiner

Primary Examiner—Arthur T. Grimley
Assistant Examiner—John Le
(74) Attorney, Agent, or Firm—Innovation Law Group, Ltd.; Jacques M. Dulin (57) ABSTRACT

Method, apparatus and computer programs are described for compensating for the effect of temperature on the sensitivity of electrostatic ultrasound (US) transducers, particularly as used in an automotive occupancy sensing (AOS) systems for sensing the nature or type of occupant and the location of the occupant with respect to the vehicle interior. The invention permits the AOS to classify the occupancy state of the vehicle from a US echo signal substantially free of the effects of temperature on signal amplitude. A capacitive divider or voltage monitor is employed to measure the capacitance of the transducer. The voltage monitor output is used by the scaling algorithm of a compensator to determine the scaling factor to be applied to the US transducer signal to compensate for the effect of temperature on the transducer sensitivity. Calibration procedures and software are disclosed for determining the coefficients of the scaling algorithm to compensate for temperature effects and also to compensate for installation factors, transducer manufacturing variations, and circuit board effects. The system disclosed is useful for other types of signal processing in addition to temperature compensation of AOS ultrasonic signals, and may be used in other ranging devices such as cameras, golf or binocular range finders, and measuring devices and instruments.

18 Claims, 8 Drawing Sheets

ULTRASOUND TRANSDUCER TEMPERATURE COMPENSATION METHODS, APPARATUS AND PROGRAMS

TECHNICAL FIELD

The invention relates to ultrasound (US) transducer temperature compensation methods, apparatus and programs, and more particularly to US transducers used in automotive occupancy sensing (AOS) systems for sensing the nature or type of occupant and the location of the occupant with respect to the vehicle interior. The system disclosed is useful for other types of signal processing in addition to temperature compensation of AOS ultrasound signals, and may be used in other ranging devices such as cameras, golf or binocular range finders, and measuring devices and instruments.

BACKGROUND ART

Studies have revealed that there is a class of automotive accidents causing injuries associated with airbag deployment and with the nature and position of the vehicle occupant, particularly with respect to airbags deployed adjacent to seats occupied by children or infants in car seats. Automotive occupancy sensor (AOS) systems used in conjunction with airbag deployment systems (ADS) have been developed to regulate the deployment of the airbag, i.e., to determine if deployment is to be aborted, deferred, modified or otherwise controlled in response to the occupancy state of the adjacent vehicle interior. For background on AOS systems see Corrado, et al., U.S. Pat. No. 5,482,314 issued Jan. 9, 1996, and U.S. Pat. No. 5,890,085 which issued Mar. 30, 1999, which patents are hereby incorporated by reference.

AOS utilize various types of sensors which produce signals which provide information relating to occupancy state. Typically electrostatic ultrasound transducers are included in AOS systems as active sensors whereby echoes of ultrasonic signals transmitted by the transducer are detected by the transducer when reflected back from the vehicle interior and occupants.

The electrostatic transducer response is highly temperature sensitive, and vehicle interiors have a large potential temperature range during operation, particularly when driving has just started after some period of non-use in hot or cold weather, and environmental controls such as heaters or air conditioners have not yet moderated extremes of heat or cold of the vehicle interior. The amplitude of the received ultrasound signal (echo signal) using an electrostatic ultrasound sensor may change by more than 200% over a temperature range of −40° C. (−40° F.) to +80° C. (+176° F.). This change has degrading impacts on a typical AOS occupancy classification algorithm.

One solution which has been proposed is to develop a classification algorithm that is robust against changes in signal amplitude. This approach has been tried with limited success, because in an ultrasound signal for occupant classification, a large amount of the distinguishing information is amplitude related, i.e., a lot of information needed for occupancy classification is present in the amplitude of the ultrasonic echo. Amplitude changes due to temperature rather than due to changes in the state of the occupants or objects being imaged could result in false classifications. It is thus important to keep amplitude variations due to environmental effects small, so that any amplitude variations seen in the echo signal are, reliably, only due to changes in the state of objects or occupants present in the vehicle.

What is needed is a mechanism and method that compensates or normalizes the ultrasound signal with respect to temperature variation such that it appears to the classification algorithm to have been collected at or near a reference temperature at which the classification algorithm is optimized, preferably near room temperature.

THE INVENTION

SUMMARY, OBJECTS AND ADVANTAGES

This invention includes the following features, functions, objects and advantages in an improved system for AOS ultrasound signal occupancy classification: A system which compensates or normalizes the ultrasound signal with respect to temperature so as to keep amplitude variations due to temperature effects small; and a system which compensates for AOS unit-to-unit variations due to manufacturing tolerances. Other objects and advantages will be evident from the description, drawings and claims.

The US echo signal amplitude compensation system of the invention comprises a hardware/software combination which includes a capacitive divider, a multiplexer, an analog-to-digital converter and microprocessor(s) which include firmware and software to sequence multiplexer switching and to apply compensation algorithms to the US signal. The conventional transducer driver circuitry provides the capacity to transmit US pulses or "pings" and to detect and receive US echo returns produced when the "ping" is reflected by objects back to the transducer. The transducer circuitry also produces a transducer output signal which is a function of the voltage across the transducer. The transducer output signal is typically a continuous output both during the pulse transmit phase (transducer operating as a US transmitter) and the echo return receiving phase (transducer operating as a US sensor or detector).

To avoid confusion, the terms "transducer signal" and "transducer output signal" will generally be used herein to refer to the electrical output signal of conventional US electrostatic transducer circuitry. The acoustic US transducer output will generally be referred to as a US pulse or ping, and the acoustic echo produced by ping reflection will generally be referred to as an echo return.

Where electrical connections and "lines" are described, these refer to conventional means for transmitting and coupling electrical signals. However, except where the context indicates otherwise, signal information in the described embodiments of AOS systems may alternatively be transmitted by other conventional means, such as fiber-optic transmission, wireless data transmission, and the like.

A capacitive divider, which also may be termed a "voltage monitor", is included in the electrostatic transducer received signal processing circuitry to permit the measurements of changes in the capacitance of the electrostatic transducer circuitry due to temperature changes. The voltage monitor signal is a scaled representation of the transducer output signal, in which the scaling effect may be pre-determined by capacitor selection. The voltage monitor signal amplitude may thus be selected so that the peak amplitude during US transmitted pulse is within the usable range of the AOS electronics. Thus, the capacitive divider subcircuit is an example of a voltage scaling subcircuit producing a scaled output representative of the transducer signal.

The magnitude of the voltage monitor output signal permits the AOS microprocessor and software to utilize real-time transducer sensitivity data to normalize the received signal and optimize the occupancy classification algorithm performance.

The multiplexer alternately selects, as time sequenced inputs, the voltage monitor signal and the transducer signal, and the multiplexer output thus contains both voltage monitor data and echo data, which is digitized by an analog-to digital converter. Software running on the microprocessor(s) of the AOS controls the sequence of multiplexer switching, extracts the digitized voltage monitor and US transducer data, applies the compensation algorithm, and scales the continuing US echo data to remove amplitude variation due to temperature. The amplitude-compensated echo signal is then used by the AOS characterization algorithm software to perform occupancy classification.

A calibration procedure is aged to gather (data on the temperature dependence of the sensitivity of the particular transducer model selected by the AOS manufacturer. Compensation or scaling parameters are computed from this data and used to adapt the compensation algorithm to the particular transducer characteristics. The AOS unit microprocessor is then programmed to apply the compensation algorithm based on these calibrated scaling parameters to scale US echo signals in operational AOS use, in response to the voltage monitor output data contained in the multiplexed AOS input signal.

In the principal embodiment, the voltage monitor measurement for the transmitted US signal from the transducer is used by the compensation algorithm to scale the received echo US signal that follows the transmitted US signal. The preferred transducers for AOS units are of a type which have substantially similar temperature dependency for both transmitted US sensitivity and received US sensitivity. Preferably, the calibration procedure also includes gathering data on unit-to-unit sensitivity variation due to transducer manufacturing tolerances, circuit board variation and installation effects. The compensation algorithm may optionally include parameters to scale or bias the echo signal to adjust for these non-temperature dependent sources of variation.

BRIEF DESCRIPTION OF DRAWINGS

The invention is described in more detail in the accompanying drawings, in which:

FIGS. 3A through 3D are flowcharts showing the preferred calibration and compensation methods of the invention, FIG. 3A showing the temperature calibration.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications and patent applications cited in this specification are herein incorporated by reference as if each individual publication or patent application were specifically and individually indicated to be incorporated by reference.

The received US signal amplitude of the electrostatic ultrasound transducer is directly related to the sensitivity of the device; the more sensitive the device, the larger the signal amplitude. However, the sensitivity of the electrostatic ultrasound transducer is inversely proportional to its capacitance, and can be modelled by the following equation:

$$V_r = \frac{CV_b k}{C_0} \qquad \text{Eq. 1}$$

where $V_r$ is the receive voltage sensitivity, $C_0$ is the capacitance of the transducer, C is the (constant) AC capacitance of the transducer, $V_b$ is the bias voltage of the transducer, and k is a constant related to the US receiver circuit board parameters.

Since $C_0$ capacitance increases with increasing temperature, the sensitivity $V_r$ decreases, changing, the amplitude of the received echo signal (reducing it). On the other hand, when the temperature decreases, $C_0$ decreases, and the sensitivity $V_r$ increases, again changing the amplitude of the received US signal (increasing it). Thus, by measuring changes in capacitance due to temperature, the voltage monitor enables one to measure the changes in transducer sensitivity due to temperature variation.

A corollary is that once the capacitance vs. temperature curve for a given US transducer is known, changes in capacitance can be used to measure temperature.

Figure 1:
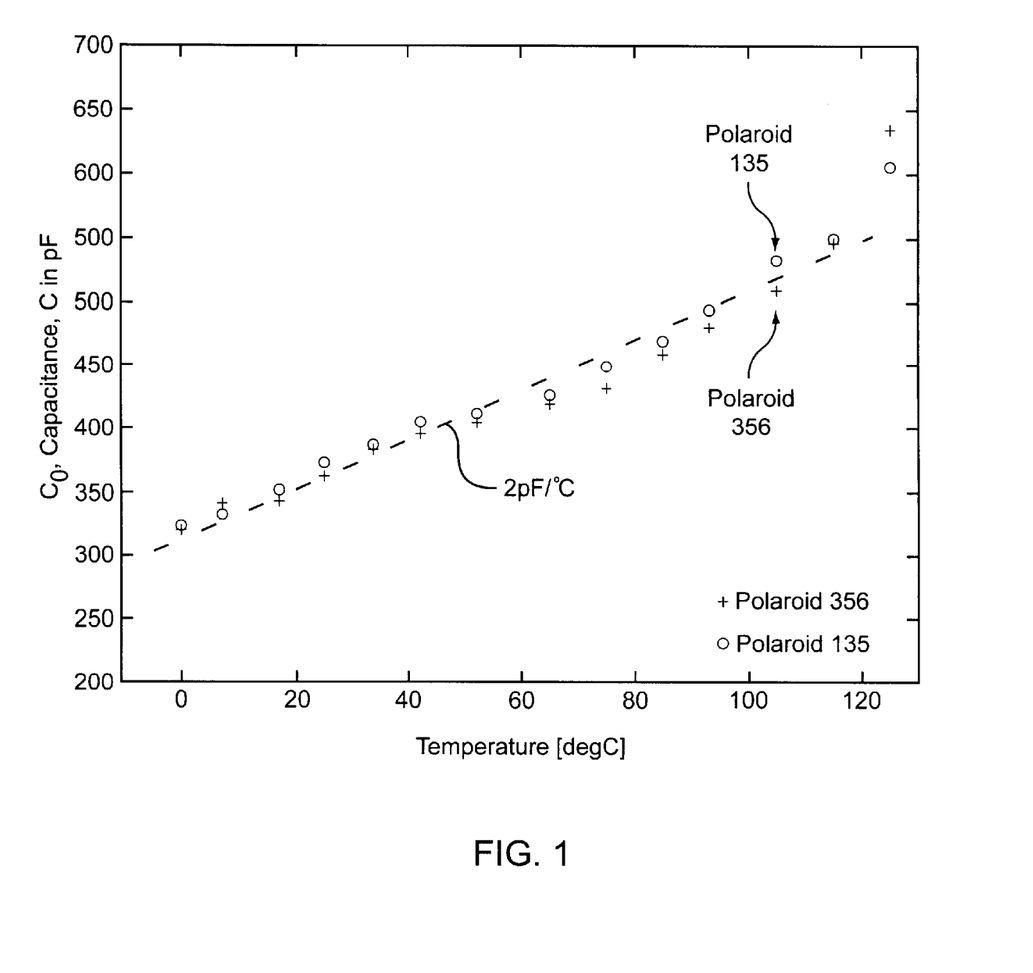
FIG. 1 is a plot showing an example of change of capacitance of an electrostatic transducer as a function of temperature.

FIG. 1 is a plot showing typical examples of the change of capacitance $C_0$ of an electrostatic transducer as a function of temperature. The data points are uncompensated values of capacitance of two exemplary transducers Polaroid 7000 series transducers, model 135 and a Poloroid 356. The Poloroid 135 data points are plotted as circles , "o", and the Polaroid 356 data points as crosses "+". The data are measured at a series of temperatures ranging from about 0° C. to +125° C. Both transducers have a similar response, showing a range of capacitance from about 325 pF at 0° C. to about 600 pF at 125° C. The data show a generally linear variation of capacitance over that temperature range up to at least 100° C. with a rate of change of about 2 pF per °C. as indicated by the dashed line.

Figure 2:
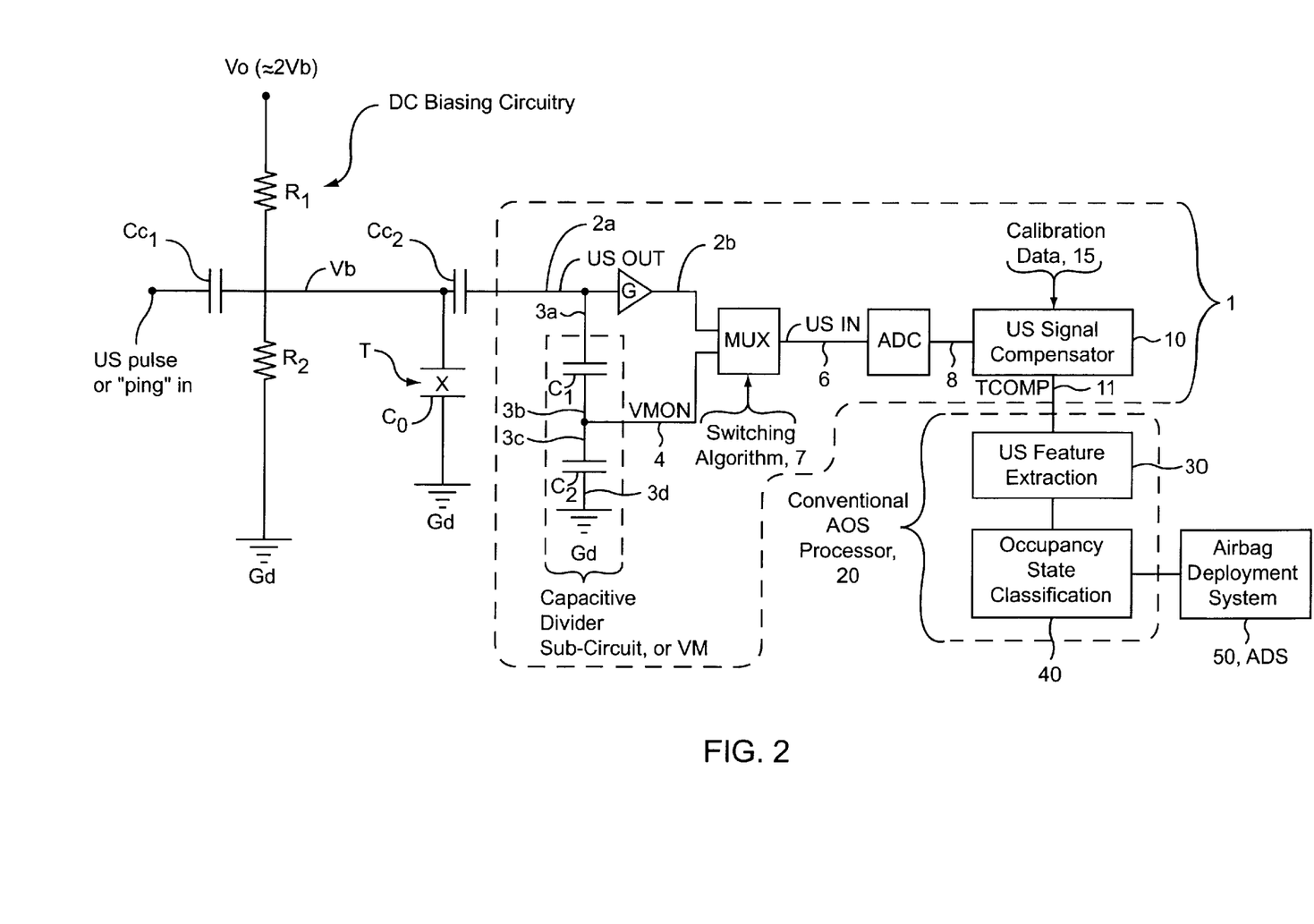
FIG. 2 is a simplified schematic diagram of preferred temperature compensation apparatus of the invention including the voltage monitor, multiplexer an compensation means as incorporated into a conventional AOS system.

FIG. 2 is a simplified schematic circuit diagram and flowchart of the US echo compensation system 1 of the invention in conjunction with a conventional automotive occupancy system (AOS) processor 20, e.g. of the same general type shown in U.S. Pat. No. 5,482,314 (except for the voltage monitor, multiplexer and compensation circuitry of the present invention), and a conventional airbag deployment system ADS 50.

A conventional electrostatic ultrasound transducer T is driven via conventional DC biasing circuitry which typically and preferably includes coupling capacitors $Cc_1$ and $Cc_2$ which isolate the biasing circuitry and transducer T from the US pulse or "ping" input at the left of FIG. 2 and the transducer output USOUT, 2a, to the right of the transducer T in FIG. 2, respectively, so that only the AC voltage through the transducer circuit is transmitted to AOS 20. The biasing voltage $V_b$ is applied across transducer T by a voltage divider including a voltage source $V_0$ of about $2V_b$, and resistors $R_1$ and $R_2$ (preferably each of about 1 megaohm). $R_1$ is included in the circuit between $V_0$ and T, and $R_2$ is included between T and ground Gd.

The compensation system 1 includes a capacitive divider or voltage monitor circuit VM, connected to electrostatic transducer T, a 2 to 1 analog multiplexer, MUX, connecting via the analog-to-digital converter ADC to the a US echo signal compensator means 10. The electrostatic transducer T is connected between ground Gd and bias Voltage Vb, and has a capacitance $C_0$. The voltage signal from the transducer USOUT is the normal US transducer echo signal (the voltage across $C_0$) which is transmitted via lines 2a and 2b to multiplexer MUX.

The voltage monitor circuit VM is a branched parallel circuit comprising capacitors $C_1$ and $C_2$ connected in series between the transducer output USOUT and ground Gd. VM branch 3a connects in parallel off USOUT 2a, 2b to $C_1$, line 3b, 3c connects from $C_1$ to $C_2$, and line 3d connects from $C_2$ to ground Gd. The voltage monitor output signal VMON is the voltage across $C_2$ from ground Gd, and the connects from the junction of lines 3b and 3c between $C_1$ and $C_2$ by line 4 to the multiplexer MUX. Thus, MUX has two inputs, USOUT, 26, and VMON, 4.

A conventional amplifier G is shown in line 2b which is preferably included to provide a pre-determined gain which increases the amplitude of USOUT to a value suitable for the resolution and operating limits of the ADC and digital signal processing of the AOS. A typical maximum amplitude of the unamplified USOUT is about 2 mV, and the gain at G is typically in the range of from about 700 to 1000, producing a typical amplified USOUT amplitude of about 1.4 to 2.0 volts. A conventional high-pass filter is also preferably included in G to effectively attenuate acoustic noise below about 20 kHz while effectively passing signals above about 40 kz (for a conventional US transducer operating at about 50 kHz).

Figure 5A:
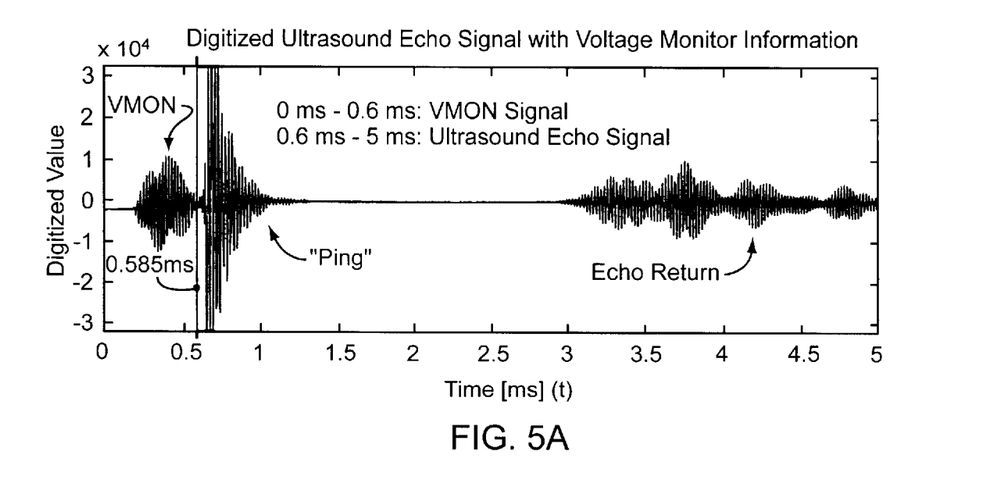
FIGS. 5A and 5B are plots which show an exemplary multiplexed and digitized US input signal USIN of the apparatus of the invention, FIG. 5B being a detail plot showing the "envelope" determination of the voltage monitor level.
Figure 5B:
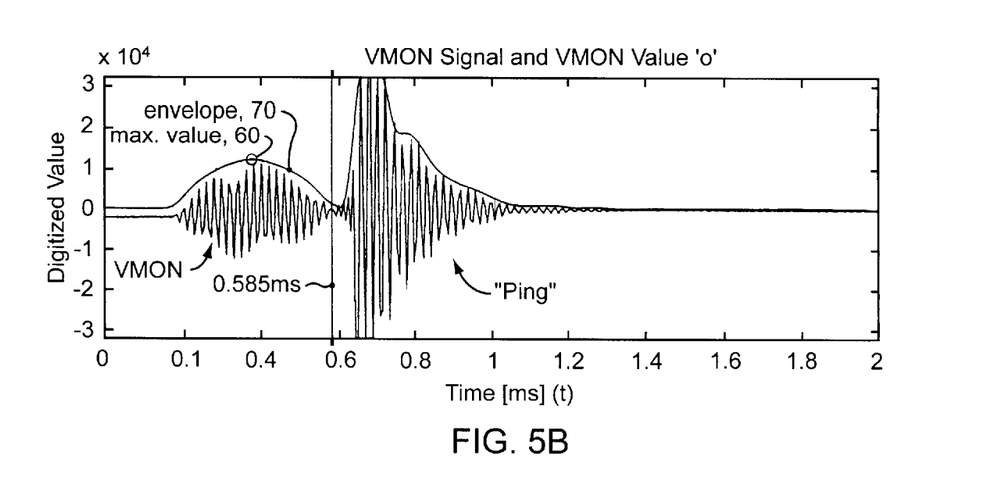

The capacitance of $C_2$ is preferably much larger than the capacitance of $C_1$, in order to produce an output signal VMON within a range suitable for the signal processing electronics. The capacitances of $C_1$ and $C_2$ are selected based on the expected range of transducer bias voltages of a particular AOS design and the desired range of signal output voltage, i.e. the desired operating range of VMON for signal processing in a particular AOS design. In general, the value of $C_1$ is preferably approximately equal or at least of the same order of magnitude as the capacitance of the transducer $C_0$, and the ratio of $C_1/C_2$, may be selected to produce a suitable maximum value of VMON. In a typical AOS, the transducer bias voltage $V_b$ will generally be in the magnitude range of 50 to 150 volts and typical AOS digital electronics will operate in the range of 5 volts or less. See discussion of FIG. 5 below for a comparison of the relative amplitude of VMON and the US echo return signal USIN.

For example, if the maximum transducer bias voltage $V_b$ is about 150 volts, and if it is desired that the maximum signal output of VMON be suited to an ADC which has a maximum undistorted signal digitizing range of −2.5 to +2.5 volts, then a division of about 1/60 is required to limit the VMON to 2.5 volts, corresponding to a ratio of $C_1/C_2$ of about 1/60. Thus, in accordance with the principles of the invention, the most suitable values of $C_1$ and $C_2$ are hardware dependent and the selection of suitable capacitance values are based on the characteristics of the transducer and signal processing circuitry employed. In general, the maximum value of VMON is selected to be within the operating range of the AOS digital electronics but large enough to have acceptably high resolution of temperature compensation as described below.

In the principal embodiment, the ratio of $C_1/C_2$, is preferably from about 1/50 to about 1/300, and most preferably about 1/100, with the capacitance of $C_1$ being preferably from about 1 pF to about 200 pF and the capacitance of $C_2$ being preferably from about 100 pF to about 0.03 $\mu$F. Typical values of the capacitances are about 150 pF for $C_1$ and about 0.022 $\mu$F for $C_2$.

The conventional multiplexer is controlled by conventional software or firmware switching algorithms running on microprocessors contained in other portions of the AOS circuitry. The multiplexer switches or selects USVMON and USOUT according to a schedule, described below, to produce a multiplex analog signal USIN comprising either USOUT or USVMON signal components. USIN is transmitted to an analog-to-digital converter ADC by line 6.

The capacitance of $C_1$ and $C_2$ will typically and preferably be selected as described above so that USVMON during the US transmit pulse will not substantially exceed the maximum digitizing level of the ADC. This maximum digitizing level, or other limiting factor of the AOS electronics, may be referred to as the maximum usable input signal amplitude.

The preferred sequence of selecting the multiplexer signal by the controlling software is as follows:
1. The multiplexer is switched to select USVMON input signal and the ADC begins digitizing the multiplexer output analog signal;
2. While USVMON is selected, the ultrasound transducer is excited or driven to transmit a US ping of short duration, preferably about 0.5 milli-seconds (0.5 ms), (ADC continues digitizing the multiplexer output signal);
3. Following excitation, the multiplexer is switched to select USOUT input signal (ADC continues digitizing the multiplexer output signal), and
4. ADC digitizing is stopped, once enough US and voltage monitor data has been collected for AOS and compensation algorithms.

At this point the acquired digitized data record contains data from the voltage monitor, as well as the ultrasound echo, in time sequence. Voltage monitor information can now be extracted from this data by the microprocessor through a straight-forward, conventional software algorithm, and used for determining the compensation algorithm and scaling parameters or coefficients. Once this step is completed, compensation (scaling) is performed on each echo before further processing (such as US feature extraction for classification) is performed.

Following the digitization of the multiplex signal USIN, the signal is transmitted to a US signal compensator means 10. This is preferably integrally incorporated within the otherwise typical AOS 20 to share as much common power supply, circuit board platform and processor capability as is feasible, but may be manufactured as a separate unit.

Likewise, the multiplexer MUX and its associated switching or sequencing algorithm and controls is preferably integrated with the AOS electronics or may be a separate unit. As disclosed herein, the compensator means 10 is programmed with calibration coefficient or parameter data 15, preferably determined by calibration procedures specific to the transducer and the circuit board response, their behavior with respect to temperature, and the vehicle installation. As disclosed in more detail below, the compensation algorithm of the compensator 10 separates the multiplexed signal components, and combines the calibration coefficient with the voltage monitor component of the digitized multiplexed USIN to determine the compensating scaling factor. The compensator 10 then scales the amplitude of the US echo component of the multiplex signal to produce an amplitude-compensated US output signal TCOMP (compensated so that amplitude is independent of temperature) which is transmitted to the US feature extraction elements 30 of the AOS 20.

Typical AOS circuitry 20 includes at least one of each of a driver for one or more transducers T to transmit US "pings" including DC biasing circuitry, a receiver of the US echoes and outputting a USOUT signal, extractor 30 to extract US echo features, classifier 40 to classify the occupancy state based on echo features (additional sensor inputs such IR may also be used), and transmit a control signal to an ADS 50 based on occupancy state. The temperature compensation apparatus 1 of the invention is incorporated functionally between the conventional electrostatic transducer T and the typical AOS 20. Instead of the echo signal USOUT being directly received by the ADC and then routed to the echo feature extractor 30 of AOS 20, (i.e., in a conventional AOS where line 2a connects directly to line 6, and line 8 connects directly to line 11), the signal is processed as described above so that the extractor 30 "sees" a compensated input TCOMP transmitted via line 11 which is substantially free of temperature dependent effects.

The US transducer T, the voltage monitor subcircuit VM and the AOS circuitry 20 are preferably mounted as close to one another as is feasible, so as to minimize internal temperature gradients within the system. Alternatively, if it is desired to separate the transducer and voltage monitor from the AOS circuitry, an optional temperature probe may be mounted within the AOS board and/or the transducer mounting, so as to permit a separate and additional scaling factor and calibration to account for temperature range within the hardware system.

Note that this compensation for transducer/circuit temperature dependent characteristics is not to be confused with conventional range compensation ordinarily performed as an aspect of the US feature extraction. This range compensation is a distinctly different correction, which is also preferably employed. The echo range calculations are based on the relationship of the echo return time interval to the range of the object(s) reflecting that echo, which is proportional to the speed of sound in the air between the transducer and the reflecting object. Since the speed of sound varies with the temperature of the air through which the US beam propagates, the range calculations must take into account the effect of local air temperature on sound velocity.

A temperature compensation algorithm included in the preferred method of this invention is based on a parabolic scaling relationship between the voltage monitor information and the received ultrasonic echo. The preferred compensation method and algorithm of the invention includes both "off-line" calibration parameters which may determined in a laboratory setting and , "on-line" calibration parameters which may be conveniently determined in a production setting at the time of AOS unit manufacture and assembly. These calibration parameters are used in the preferred compensation algorithm to compute scaling factors at "run-time" in the operating AOS unit as installed in a vehicle. The algorithm, calibration parameters and scaling factors are described in the Eqs. 2 and Eq. 3 below. The calibration process is also depicted in flowcharts in FIGS. 3A–D. Exemplary software routines which may be used to automate the calibration process are included in Appendix A attached hereto.

The scaling parameters are determined by first characterizing the relationship between the echo amplitude and the voltage monitor. The general scaling equations are:

$$S_1 = B \text{ scale} \qquad \text{Eq. 2a}$$

$$S_2(V_m) = aV_m^2 + bV_m + c \qquad \text{Eq. 2b}$$

$$S_{global} = S_1 S_2 \qquad \text{Eq. 2c}$$

where a, b, c and Bscale are the parameters determined during calibration (described below), $V_m$ is the magnitude of the voltage monitor signal component of the digitized multiplexed signal USIN, $S_1$ and $S_2$ are intermediate scalars representing corrections for hardware-specific and temperature-dependent effects respectively, and $S_{global}$ is the overall scaling factor. These equations are evaluated "real-time" by the compensation processor (10 in FIG. 2) and the value of $S_{global}$ is applied by the processor to the amplitude of the US echo signal component of USIN to produced the compensated US signal TCOMIP (at 11 in FIG. 2).

Figure 3A:
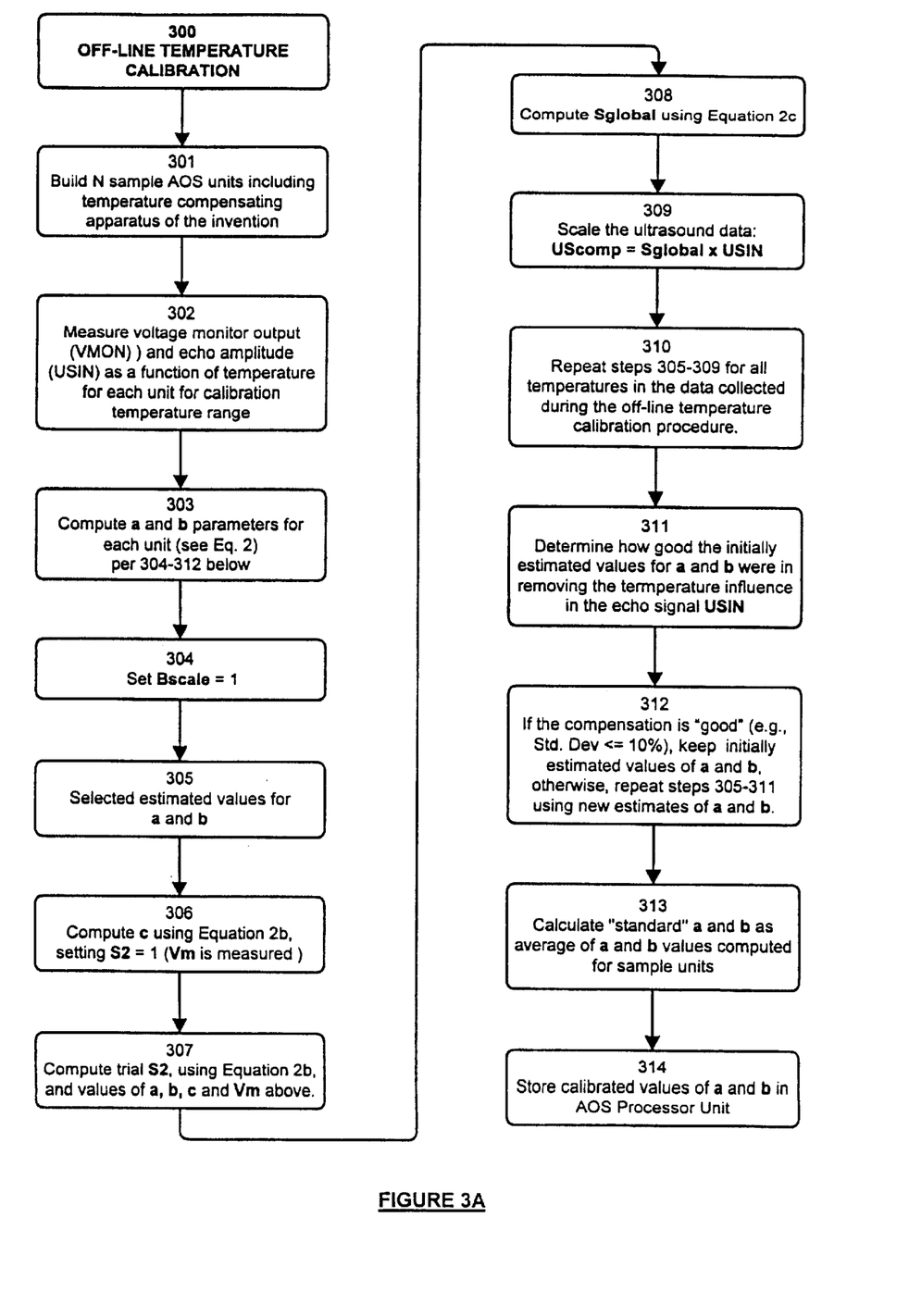

FIG. 3A shows schematically the preferred off-line temperature calibration process 300. The parameters a and b characterize the relationship between the temperature behavior of the transducer and the circuit board, and are typically substantially the same for all circuit board units of the same architecture, as long as the hardware, both circuit board and transducer components remain unchanged within reasonable component tolerances. Thus the relatively time-consuming thermal cycling calibration procedure used to determine a and b need only be performed once as a laboratory calibration "off-line" for a small set of sample units of the specific architecture of the circuit board and transducer combination (herein "temperature calibration"). Accordingly, N sample units having the temperature compensation system of the invention are built, 301. The VMON output and USIN is measured over a range of temperature, say from –20° C. to +60° C. on each of the N sample units 302 (see, for example, FIGS. 4A and 4B). Parameters a and b may be computed, 303, from the echo amplitude/voltage monitor output relationships over a range of calibration temperatures, by "Monte Carlo" analysis or by alternative conventional analysis methods, such as "gradient-search" or "steepest descent" methods). For example, the values of a and b may be computed by the following steps as shown in FIG. 3A:

304: Set Bscale=1 in Eqs. 2a and 2c (i.e., assume the transducer is an ideal and representative transducer).

305: Select an estimated or trial value for a and b (note: $V_m$ is available as part of the temperature calibration data).

306: Compute c using Equation 2b, setting $S_2=1$.
307: Compute "real" $S_2$, using Equation 2b, and values of a, b, c and $V_m$ above.
308: Compute Sglobal using Equation 2c.
309: Scale the ultrasound data USIN with $S_{global}$: $US_{comp}=S_{global}\times USIN$.
310: Repeat steps 305–309 for all temperatures in the data collected during the off-line temperature calibration procedure.
311: Determine how close the result in step 7 comes to a straight line (i.e., determine how good the initially estimated values for a and b were in removing the temperature influence in the echo signal USIN).
312: If the compensation is "good" (i.e., standard deviation <=10%, for example), keep the initially estimated values of a and b, otherwise, repeat steps 305–311 using new estimated values of a and b.

Note that the estimated values in the example steps 305 and 312 above are preferably based on values which are known to one of ordinary skill in the art to be reasonable and physically allowable values. A plurality of estimated values spanning the range of reasonable values may be computed to allow progressively better estimates to be selected at each iteration as in step 312, permitting rapid convergence to an acceptable value for each parameter without undue experimentation. Exhibit B is an example of a computer program that may be used to automate the calibration process outlined above.

The "standard" a and b values 313 may be established as the averages of the values computed for the sample units. At the AOS production or "assembly-line" stage, the values of a and b so determined need only be stored at 314 into the processor memory of each AOS production unit. Exhibit C is an example of a computer program that may be used to determine these "standard" values.

Figure 3B:
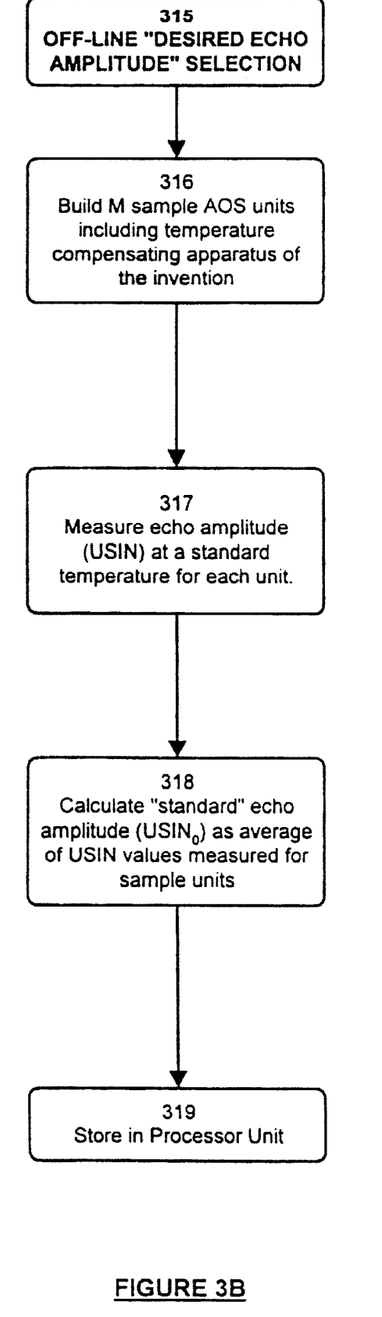
FIG. 3B showing the "desired echo amplitude" selection, FIG. 3C showing the hardware calibration, and FIG. 3D showing the run-time US echo signal compensation method.

FIG. 3B shows schematically the preferred off-line "desired echo amplitude" selection process 315. The "desired echo amplitude" may be module, vehicle platform, calibration stand, and transducer dependent, and may be determined empirically. A number, M, of sample units are built, 316. The desired or "standard" echo amplitude $USIN_0$ may be preselected as the measured average of echo amplitude for a M sample units receiving an echo from a test target at a standard temperature 317. Alternatively, the "desired echo amplitude" may be pre-selected as some other amplitude suitable for AOS feature extraction processing. In another alternative, a model may be developed that includes factors such as calibration stand target size and position, module orientation, transducer parameters, grille influences, circuit board transmit and receive influences, and the like, so that the "desired" or "expected" amplitude is determined analytically. The M sample unit average echo amplitude $USIN_0$ is calculated, 318. During AOS manufacture, the values of a, b, c and Bscale as determined above are stored in the AOS electronic non-volatile memory, 319.

Figure 3C:
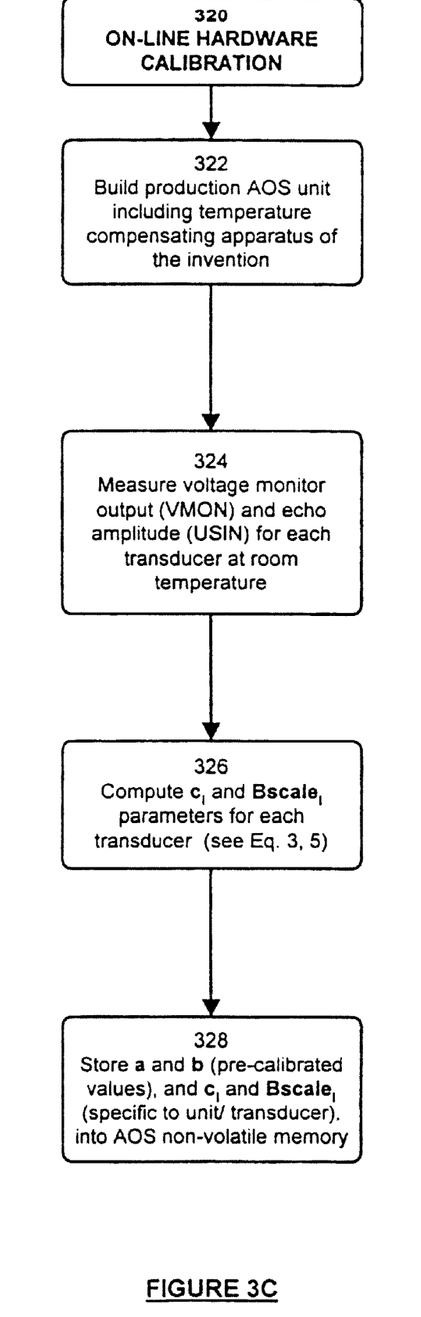

FIG. 3C shows schematically the preferred on-line hardware calibration process 320. The units are built, 322, the VMON and USIN are measured at room temperature, 324. Parameters c and Bscale characterize the transducer and circuit board specific variations due to manufacturing tolerances, and are preferably included to remove the effect of these variations from the compensated US echo signal. These are computed "on-line" at room temperature in the AOS production stage 326, since this calibration process (herein "hardware calibration") is quite rapid, taking only on the order of 4 seconds per unit to complete. The C and B scale parameters are then stored in AOS memory 328.

The calibration procedure for c and Bscale may be according to the following formula:

$$c=1-aV_m^2-bV_m \qquad \text{Eq. 3a}$$

$$Bscale = \frac{USIN_0(\text{desired echo amplitude})}{USIN(\text{actual measured echo amplitude})} \qquad \text{Eq. 3b}$$

where $V_m$, a, b, c and Bscale have the same meaning as in Eqs. 2 a–c above. For purposes of the hardware calibration procedure, the values of a and b have been previously determined during the temperature calibration. The value of Vm is that which is measured by the voltage monitor for the specific transducer/circuit hardware being calibrated. The value of c is established so that the polynomial summation $S_2(V_m)$ of Eq. 2a above is equated to 1 at the system temperature prevailing during hardware calibration, as shown by Eq. 3a. Since the hardware calibration in the preferred embodiment is not intended to remove temperature effects, the value of $S_2$ is set to 1 during the hardware calibration. The corresponding value of Bscale is then established to compensate for the difference in actual measured echo amplitude USIN (under calibration conditions) and a desired or "standard" echo amplitude $USIN_0$ as shown in Eq. 3b. The actual echo amplitude may be determined by measurement (using the specific AOS transducer/circuit hardware being calibrated) of the amplitude of USIN resulting from transmitting from the a US pulse and receiving an echo from a test target.

Figure 3D:
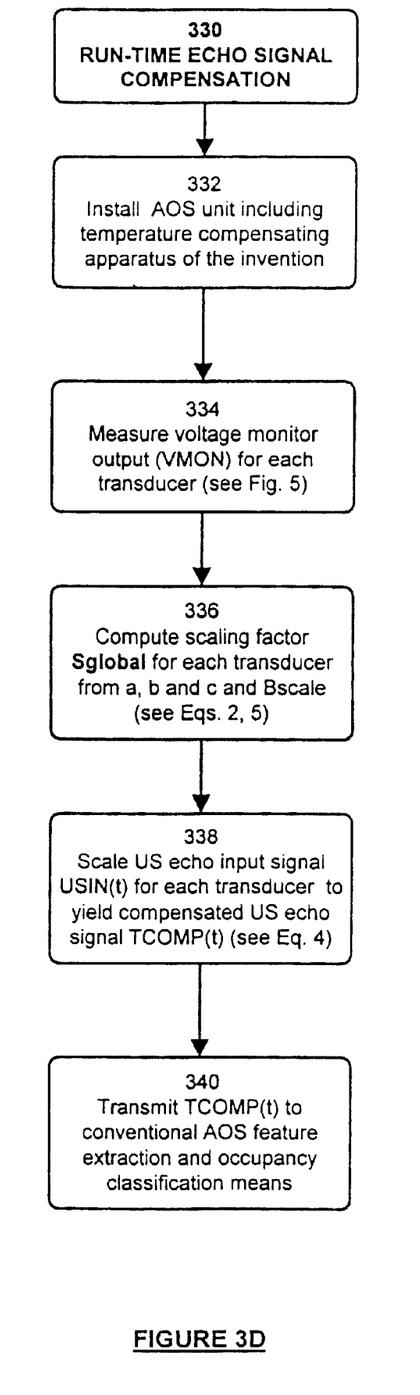

FIG. 3D shows schematically the preferred runtime (in operation) compensation process 330, after installation of the AOS units including the temperature compensation system of the invention in a vehicle, 332. The VMON for each transducer is measured, 334 during operations of the AOS unit. During actual AOS "realtime" operation 334, Eqs. 2a–c are then evaluated as described above based on the measured $V_m$ values prevailing during AOS operation. Note that during AOS operation, the value of $S_2$ of Eq. 2b will, in general, not be equal to 1, since the operating temperature of the AOS transducer/circuit hardware will, in general, not be identical to the temperature during hardware calibration. $S_{global}$ is evaluated at 336 by the compensation processor as shown in Eqs. 2A–C, and then the digitized US echo input signal USIN is scaled on a realtime basis 338 by the processor to produce a compensated US echo signal TCOMP as follows:

$$TCOMP(t)=Sglobal\ USIN(t) \qquad \text{Eq. 4}$$

This TCOMP signal 340 is transmitted to the AOS unit (see 11 in FIG. 2).

Typical AOS units may include multiple US transducers, each transmitting and/or receiving US pings and echo return signals. Where an AOS unit includes multiple transducers, the hardware calibration is preferably performed separately for each transducer, and the compensation algorithm preferably includes compensation for manufacturing tolerances of each transducer by evaluating Eqs. 2 a–c separately for each transducer signal USIN based on separate real-time voltage monitor measurements for each transducer. For example, in an AOS including four transducers, a total of calibration parameters may be used in the compensation algorithm: a single value each for a and b (the same value of each is used for each transducer), and four different values of c and Bscale (a specific value of each is used for each transducer). Thus, for an AOS with i transducers, the equations Eqs. 2 a–c may be generalized as follows:

$$S_{1,i} = B\text{scale}_i \qquad \text{Eq. 5a}$$

$$S_{2,i}(V_{m,i}) = aV_{m,i}^2 + bV_{m,i} + c_i \qquad \text{Eq. 5b}$$

$$S_{global,i} = S_{1,i} S_{2,i} \qquad \text{Eq. 5c}$$

Figure 4A:
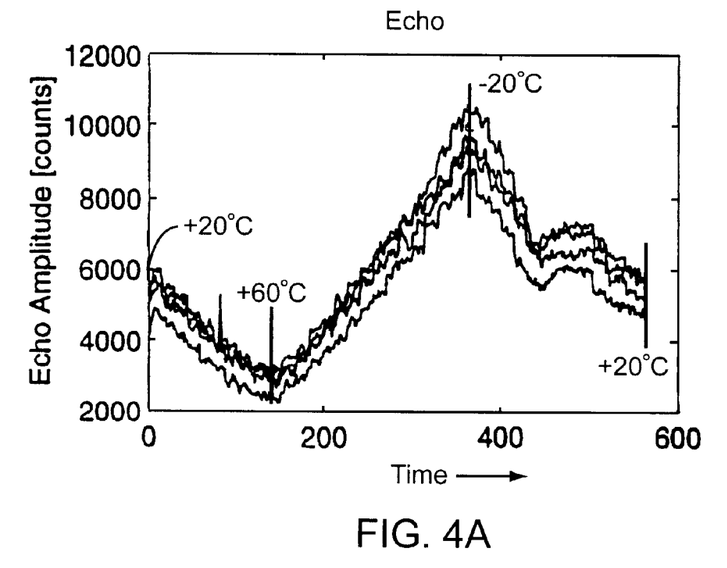
FIGS. 4A and 4B are exemplary plots showing uncompensated the echo signal amplitude and the voltage monitor amplitude respectively through a range of temperatures cycled from −20° C. to 60° C.
Figure 4B:
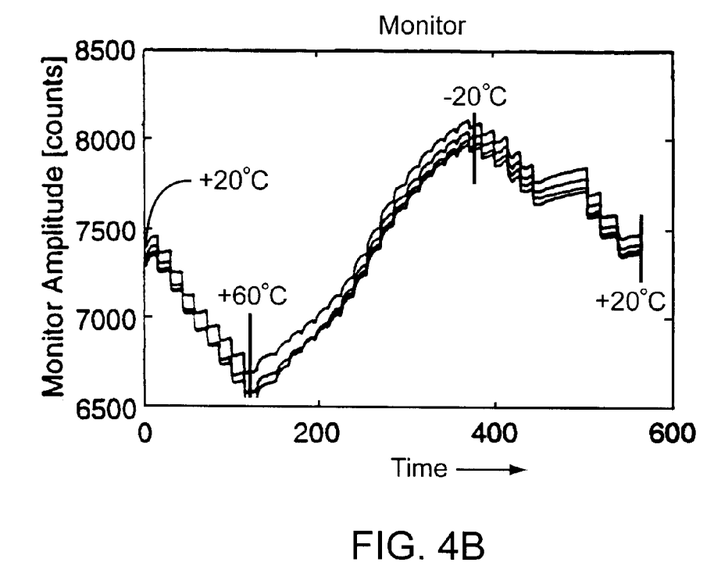

FIGS. 4A and B are plots which show experimental results using a module of four US transducers to record both the echo amplitude (FIG. 4A) and the voltage monitor amplitude (FIG. 4B) through a range of temperatures cycled from 20° C. up to 60° C., then down to −20° C. and back up to 20° C. Note that FIGS. 4A and 4B each show a pattern of four generally parallel spaced curves, demonstrating that the variation from transducer-to-transducer of the same model or type is generally constant and not demonstrably temperature dependent. As can be seen in the following Table 4A/B, there is an excellent correspondence or correlation between the shape of the curves of echo amplitude in FIG. 4A and the curves of the voltage monitor amplitude in FIG. 4B throughout this temperature range.

TABLE 4 A/B

Correlation Of Echo Amplitude To Monitor Voltage

| Transducer | Correlation |
|---|---|
| #1 | 0.96636 |
| #2 | 0.96368 |
| #3 | 0.97362 |
| #4 | 0.96868 |

Figure 4C:
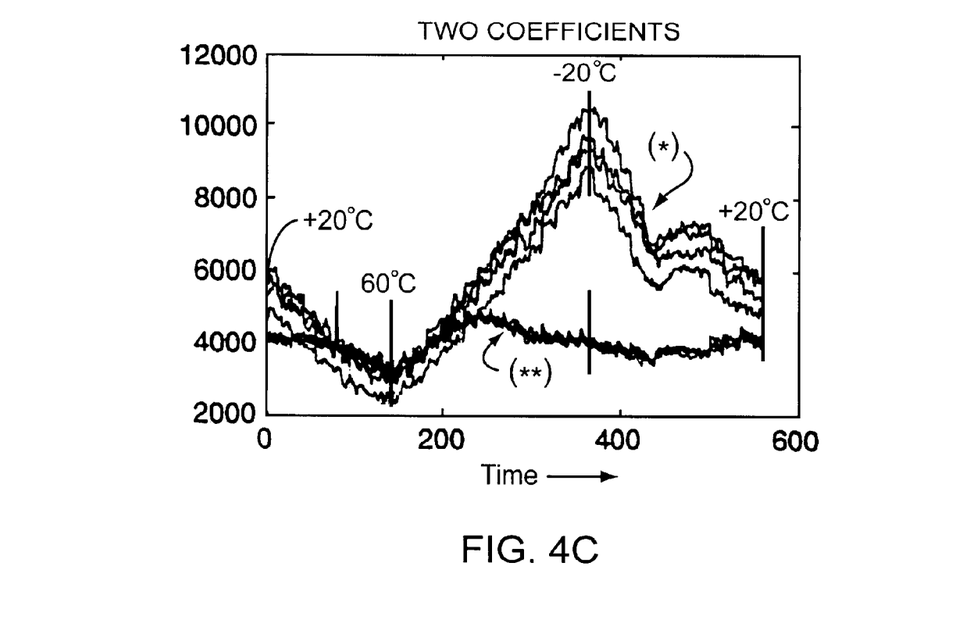
FIGS. 4C and 4D are plots which show a comparison between uncompensated and compensated echo amplitudes using( the system of the invention, for temperature dependent parameters only (FIG. 4C) and for both transducer specific and temperature dependent parameters (FIG. 4D)
Figure 4D:
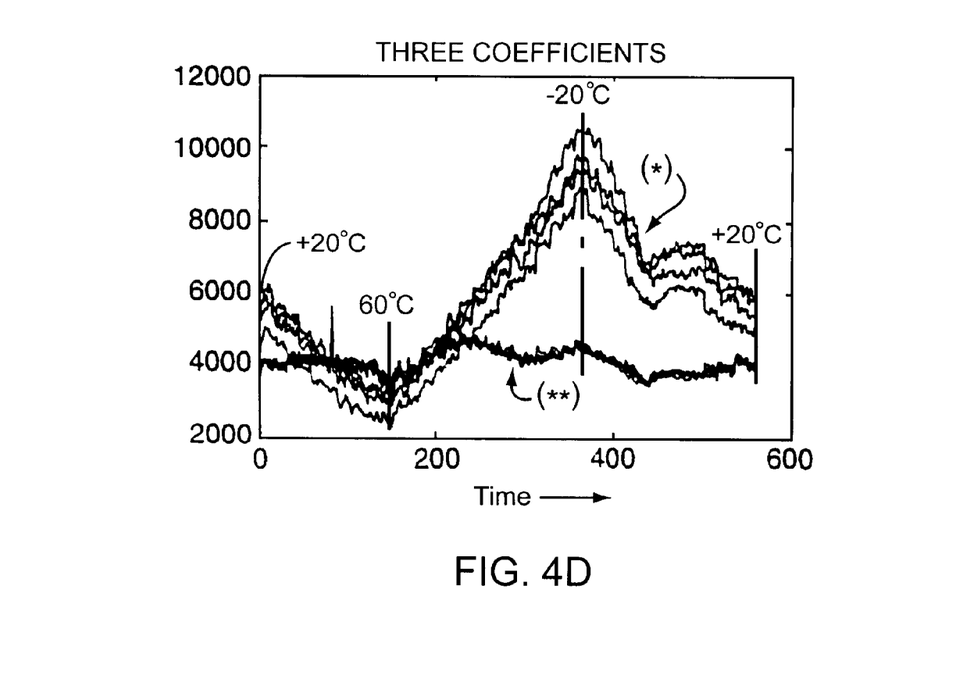

Optionally, the scaling algorithms may be simplified and, for example, may be calibrated and performed as a linear equation based only on parameters b and c, as shown in FIG. 4C below. FIGS. 4C and 4D each show a comparison between the uncompensated or unscaled echo amplitudes of 4 units (*=unsealed; upper 4 curves), and the compensated echo amplitudes of the same 4 units (**=scaled; lower 4 curves), FIG. 4C show the result of a two-coefficient scaling algorithm (parameters b and c of Eq. 2 only), and FIG. 4D showing the result of a three-coefficient scaling algorithm (both transducer specific and temperature dependent parameters a, b and c of Eq. 2). Tables 4C and 4D below show the computed coefficients or parameters for each transducer and the corresponding standard deviations for uncompensated ($STD_0$) and compensated ($STD_n$) US echo signals. It can be seen that for both FIGS. 4C and 4D, the amplitude variation for the scaled echo data is dramatically reduced, being essentially flat, in comparison to the unsealed echo data over the temperature range, and that the scaling compensates both for variation due to temperature and variation between transducers. Furthermore the 3-coefficient approach compensates substantially better for amplitude variations than the 2-coefficient approach and represents the best mode of the compensation of the invention.

TABLE 4 C

Compensation Of US Echo Signal Using Two Coefficients

| | Transducer #1 | Transducer #2 | Transducer #3 | Transducer #4 |
|---|---|---|---|---|
| $STD_0(\%)$ | 33.8728 | 31.8479 | 28.3745 | 34.0864 |
| $STD_n(\%)$ | 9.337 | 8.8492 | 9.095 | 8.74 |
| b | −6.1761e-4 | −5.2872e-4 | −4.5698e-4 | −5.2967e-4 |
| c | 5.4256 | 4.6457 | 4.06 | 4.668 |

TABLE 4 D

Compensation Of US Echo Signal Using Three Coefficients

| | Transducer #1 | Transducer #2 | Transducer #3 | Transducer #4 |
|---|---|---|---|---|
| $STD_0(\%)$ | 33.8728 | 31.8479 | 28.3745 | 34.0864 |
| $STD_n(\%)$ | 7.8663 | 8.0808 | 7.0089 | 7.6162 |
| a | 2.5486e-7 | 1.8076e-7 | 2.865 e-7 | 1.9951e-7 |
| b | −4.4115e-3 | −2.2107e-3 | −4.6946e-3 | −3.5357e-3 |
| c | 19.4989 | 14.5648 | 19.686 | 15.9583 |

FIGS. 5A and 5B are plots which show a example of the preferred multiplexed and digitized US input signal USIN of the apparatus of the invention (transmitted in line 8 of FIG. 2 from ADC to Compensator 10). In each figure, the digital value of the signal is plotted as the vertical axis, with time on the horizontal axis in milli-seconds. For a typical AOS system the time duration of each US update (i.e., the cycle of "ping" transmission and echo reception) may be about 5 ms. The length of this period is selected to be sufficient to allow the US ping to be transmitted and the corresponding US return echo to be received from any objects in the target zone.

As shown in FIG. 5A, starting from the left of the time axis, the VMON signal is preferably selected by the multiplexer (from line 4 in FIG. 2) for the first portion of the cycle from t=0 to about t=0.585 ms. The voltage monitor output is essentially a scaled representation of the digitized transmit pulse or "ping". Note the amplitude has been scaled by selection of voltage monitor capacitance to be of comparable magnitude to the US echo signal.

The multiplexer then switches to the US echo signal (line 2b in FIG. 2) from about t=0.585 ms to about t=5 ms, which signal may contain a portion of the transmitted US "ping" and also contains the US return echo. In the example of FIG. 5A, the US "ping" attenuates by about t=1 ms and the US return echo signal begins at about t=3 ms. Note that the "ping" is of much larger magnitude than the return echo.

FIG. 5B is a detailed view of the signal shown in FIG. 5B, showing the first 2 ms of the period at a larger horizontal scale and showing the VMON signal more clearly for 0<t<0.585 ms. The VMON signal is the sequence of digital values measured by the ADC at its sample rate. For a typical AOS-ADC, the sample frequency may be about 156 kHz. This sampling rate represents a period of about 0.0064 ms, and thus the digital signal over 0<t<0.585 ms constitutes about 91 samples (0.585 ms*156 kHz=91.3).

The value of VMON amplitude, $V_m$, which is preferably used to compute the scaling factor is the maximum amplitude 60 of the envelope 70 of the digitized VMON signal. The envelope and maximum envelope value are indicated in FIG. 5B. The envelope of this signal may be computed and maximum value of the envelope may be extracted by conventional methods from the digital VMON signal by temperature compensator 10. Alternative procedures may be used to determine $V_m$ by extracting a maximum sampled value or magnitude of the VMON digitized signal.

The EXHIBITS A, B C, and D set forth in the Appendix to the application are examples of computer software programs (as pseudocode) procedures which may be used to determine calibration parameters and carry out the compensation algorithm and method of the invention. These represent only one of many feasible alternative software and procedural embodiments of the particular method steps of the invention, and serve to further illustrate the principles of the invention. The specific calibration criteria and code included in these routines are not intended as limits upon the method of the invention, but represent an exemplary industrial mode of the invention. Likewise, references to particular vehicle installations are simply examples.

EXHIBIT A is an exemplary software program which may be used to compute the module or hardware dependent calibration parameters c and Bscale (see Eq. 3 above).

EXHIBIT B is an exemplary software program which may be used to compute the temperature dependent calibration parameters a and b.

EXHIBIT C is an exemplary software program which may be used to display the temperature dependent parameters a and b, computed by means of the software program of EXHIBIT B above.

EXHIBIT D is an exemplary pseudocode procedure for carrying out the calibration compensation method of the invention, using the software programs set forth in EXHIBITS A–C above.

Industrial Applicability

It is evident that the improved AOS amplitude compensation mechanism of the invention including the voltage monitor subcircuit and supporting algorithms of this invention have wide industrial applicability to AOS systems and other uses. In particular, this system may be additionally used for:

1. Self-Diagnosis: If the electrostatic ultrasound sensor with a capacitance $C_0$ is shorted or open-circuited, the voltage monitor value changes drastically enough to easily detect these conditions. Threshold-based software routines in the AOS microprocessor may then respond in a pre-selected manner as appropriate to the condition.

2. Clickless Biasing: With conventional modifications to the circuit, the electrostatic ultrasound transducer may be biased (charged up) and kept charged up during operation. This has the net effect that the audible click that is generated during biasing can be minimized or even eliminated (except for the initial biasing step).

3. Controlled Leak: With conventional modifications to the circuit, the remaining charge on the electrostatic transducer can be monitored and depleted to a known level (or completely depleted, i.e. zero charge stored on the electrostatic transducer's capacitance $C_0$). This results in a known state (initial state) for the next excitation of the device. This could eliminate the ping-to-ping variation that is currently seen with these devices that partially results from starting the excitation of the device from an unknown state, i.e. some unknown amount of charge was still "left over" from the previous excitation, adding to the charge stored on the device during current excitation, and most probably exciting the transducer in a slightly different manner and thus obtaining a slightly different echo response in return.

4. Use on Other Devices: The monitoring circuit and software compensation algorithm of the invention can be used on a wide variety of commercial devices, such as cameras, binoculars, ultrasonic diagnostic devices, and measuring devices equipped with US range finders, such as interior ultrasound electronic measures.

5. Temperature Sensing. Since the temperature vs capacitance curve is determined for a particular transducer circuit of the invention, changes in capacitance during operation can be monitored to provide a temperature value that can be output to a display device or memory storage unit as a measured temperature.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be, including equivalents of the structures and functions.

APPENDIX (Exhibits A–D)

EXHIBIT A

```
%   Desired.m
%   Use this program to compute the module-dependent ultrasound
%       calibration values
%
%   Steps:
%   1.  Collect at least 5 days worth of calibration stand data for all
%       available m
%       Use pchost -d -burst 1, 5, 1 -log filename.dat. Make sure that the
%       filename e
%       the module number, and the date at which the data was
%       collected.
%   2.  Upload the calibration stand data to the workstation.
%   3.  Create calibration stand data lists, one list for each module in
%       sortdata
%       Name these lists: mod1.lis, mod2.lis, mod3.lis, ..., modN.lis,
%       where N is t
%       modules available.
%   4.  Create a *.mat file with the variable MODULE, that identifies
%       available mod
%       Example: MODULE=[1 2 4 5] means that data is not available
%       for module 3.
%   5.  Verify that the that the vehicle platform is represented.
%       Notify R. Seip if not, so that changes can be made.
%   6.  Run desired.m to compute the ultrasound scaling parameters:
%       Bscale, a, b, c
%
%   NOTE 1: parameters a and b are currently hardcoded and assume
%       GEN5D hardware and ultrasound transducers.
fc=50e3;
fs=156e3;
vmsta=(1 1 1 11;
vmsto=[90 90 90 90];
VM=[ ];
EM=[ ];
disp('Routine to compute ultrasound scaling parameters (Gen5D/4200tx
        version)');
disp(' ');
disp('Calibration stand geometry currently available for:');
disp(' ');
disp('1 Nissan Q45');
disp('2. Ford F150 Truck 8');
disp(' ');
p=input ('Compute calibration values for which platform: ');
if p==1,
    platform='Nissan Q45l
    echosta=[450 400 500 400]
    echosto=[600 550 650 550]
else if p==2,
    platform='F150 Truck8'
    echosta=[550 450 550 650]
    echosto=[700 600 700 800]
else
    platform='UNKNOWN PLATFORM!!!'
    echosta=[1 1 1 1]
    echosto=[1 1 1 1]
end
a=input ('Variable a: ');
b=input('Variable b:');
mf=input('Module file: ','s');
command=['load ' mf];
eval(command);
N=length(MODULE);
for i=1:N,
    modlistname=[' mod' num2str (MODULE(i)    lis' I;
    disp(' 1);
    disp ( [I Results f or ' modlistname
```

-continued

APPENDIX (Exhibits A–D)

```
    disp('            ');
    [L,CC]=readlist(modlistname);
    L
    disp('Vmon(us1,us2,us3,us4) - - - Echo(us1,us2,us3,us4)');
    [r, c] =size (L)
    modvm=[ ];
    modem=[ ];
    for m=1:r,
        us=readaos3us(L(m,:));
        [rr, cc] =size (us) ;
        usbb=bbt(us,fc,fs);
        [usr,usc]=size(usbb);
        uscnt=1;
        for usi=1:usr/4,
            for usj=1:4,
                vm(uscnt)=max(usbb(uscnt,vmsta(usj):vmsto(usj)));
                em(uscnt)=max(usbb(uscnt,echosta(usj):echosto(usj)));
                uscnt=uscnt+1;
            end
        end
        vm=round(mean(reshape(vm,4,rr/4)'));
        em=round(mean(reshape(em,4,rr/4)'));
        VM=[VM; vm];
        EM=[EM; em];
        modvm=[modvm; vm];
        modem=[modem; em];
        disp([num2str(vm) ' --- 'num2str(em)]);
    end
    mvm (i, :) =round (mean (modvm)
    mem(i,:)=round(mean(modem));
end
disp (' ');
disp ( [ ' Desired echo for ' platform ' : ' ] ) ;
disp (' ');
des=round (mean (EM));
disp (des);
disp (' ');
for i=1:N,
    disp ( [ 'Bscale for module ' num2str (MODULE (i)) ' : ' ] ) ;
    Bscale(i,:)=des./mem (i, :) ;
    disp(Bscale(i, : ) ) ;
end
for i=1:N,
    disp PC f or module I num2str (MODULE (i) ) ' : ' ] ) ;
    C (i, =1 -a*mvm (i, :) . ^ 2 -b*mvm (i, :);
    disp (C (i, :) ) ;
end
```

EXHIBIT B

```
%   ganl.m
%   program used to compute a and b by looking at the minimum average
%   error in standard deviation between desired and actual.
%   (once completed, use ganldisp.m to generate statistics and actual
%   values for a and b).
F=[ 'mod01h' ; . . .
    'mod04h' ; . . .
    'mod05h' ; . . .
    'mod08h' ; . . .
    'mod09h' ; . . .
    'mod10h' ; . . .
[r, c] =size (F);
a=linspace (0.5e -7, 10e -7, 300);
b=linspace (-15e-3, 0, 305);
desired=[3000 5000 3500 2500]
smax=2;
smin=0.5;
msta=5;
msto=14;
for k=1:r,
    command=['load' F(k,:)];
    eval(command);
    clear ME MV
    for tx=1:4,
        ME(tx,:)=medfilt(me(tx,:),3);
        MV(tx,:)=medfilt(mv(tx,:),3);
    end
    subplot(211);
```

-continued

APPENDIX (Exhibits A–D)

```
    plot(ME');
    title(F(k,:));
    subplot(212);
    plot(MV');
    drawnow;
    for i=1:length(a),
        for j=1:length(b),
            p=[a(i)b(j)0]
            (sn,ma,mi]=an14f(desired, ME, MV, msta, msto, smax,
                smin, p);
            SN (i, j, k) =mean (sn)
            MA (i, ,j, k)=mean(ma);
            MI (i, ,j, k)=mean(mi);
        end
        disp(['File: ' F(k,:) ' Index: ' num2str(i)]);
    end
end
save ab SN MA MI a b
function [sn,ma,mi]=an14f(desired,ME,MV,msta,msto,smax,smin,p)
%   [sn,,ma,mi]=an14f(desired,ME,MV,msta,msto,smax,smin,p)
%   Use this function to compute the scaled data based on vmon info, and
%   compute and return the standard deviation between desired and actual.
a=p(1);
b=p(2);
%   determine scale factor ...
for i=1:4,
    bscale(i) = desired (i)/mean (ME (i, msta:msto) );
end
%   determine 3rd parameter...
for i=1:4,
    c(i) = 1 -a*mean(MV (i, msta:msto) ) ^ 2 -b*mean (MV (i, msta:
        msto));
end
%   scale data (initial scale) . . .
for i=1:4,
    MES (i, :) = ME (i, :) *bscale (i);
end
%   scale data (vmon scale) . . .
for i=1:4,
    MESS(i, :) =MES(i, :) . *vscale2 (MV (i, :) , [a b c (i) ], smax,smin);
end
sn=std (MESS') . /mean (MESS') *100;
ma= (max(MESS') -desired) ./desired*100;
mi= (min(MESS') -desired) ./desired*100;
function s=vscale2 (vmon,p,smax,smin)
% function s=vscale2(vmon,p,smax,smin)
s=polyval(p,vmon);
for     i=1:length(s),
        if s(i)>smax, s(i)=smax;end
        if s(i)<smin, s(i)=smin;end
end
```

EXHIBIT C

```
%   ganldisp.m
%   use this program to display values for a and b computed with ganl.m
load ab
[da, db, d] =size (SN)
disp(' ');
disp ('Minimum standard deviation of scaled echo over temperature
    profile:');
m=zeros (length(a), length(b));
meana=0;
meanb=0;
for i=1:d,
    [value,locb]=min(min(SN(:,:,i)));
    (value,loca]=min(min(SN(:,:,i)'));
    string=[' IndexA: ' num.2str(loca) ' a:'   num2str(a(loca)) ...
        ' IndexB: ' num2str(locb) ' b: ' num2str(b(locb)) ...
        ' MinSTD: ' num2str(SN(loca,locb,i))];
    disp(string);
    m=m+SN(:,:,i);
    meana=meana+a(loca);
    meanb=meanb+b(locb);
end
m=m/d;
meana=meana/d;
meanb=meanb/d;
```

-continued

APPENDIX (Exhibits A–D)

```
disp(' ');
disp([' MeanA: ' num2str(meana) ' MeanB: ' num2str(meanb)]);
disp(' ');
(value,locb]=min(min(m));
[value,loca]=min(min(m'));
disp(['MeanA(matrix): ' num2str(a(loca)) ' MeanB(matrix): '
        num2str(b(locb))
```

EXHIBIT D

Procedure to Utilize and Calibrate Modules using Voltage Monitor Information. Note: This document contains application engineering tasks (labeled AE), software tasks (labeled SW), datataker tasks (labeled DT), and algorithm tasks (labeled AG).
Steps:
Build up as many functional AOS modules for a particular platform as possible (minimum 6), outfitted with ultrasound transducers whose pulse-echo tolerance is ±10% off of a previously defined transducer specification.
Collect calibration stand data for each module at 20° C. ±2° C., and 30% RH ±3% RH: Pchost -r -burst 1, 10, 1 filename.dat; where filename is divided as follows: (C][2 digit module number)[2 digit month][2 digit day][A: am, P:pm].dat.
Upload this data periodically on to the appropriate directory on the server). Repeat this procedure for all modules at least twice a day.
Determine the "desired" pulse-echo response (DPER) for each transducer number across all modules by computing the mean of the target echo amplitude for each transducer across all modules - "actual" pulse echo response (APER)..
Note #1: Ideally, the target echo amplitude for each transducer number across all modules will be within ±10% of the mean for any particular transducer number.
Note #2: If significant variations from the mean exist in pulse-echo response for a particular transducer in a particular module, determine the cause and possibly replace the transducer.
Note #3: The "desired" pulse-echo response is module, vehicle platform, calibration stand, and transducer dependent, and is determined empirically.
Compute first set of parameters - Bscale (module and transducer dependent) (AG):
    For module = 1 to N,
        For transducer = 1 to 4,
            Bscale (module, transducer) = DPER (transducer)/
                APER (module, transducer)
        End
    End
Note #1: Each AOS module will have a set of 4 Bscale parameters (one for each transducer); these values are determined once at calibration, and even though are module dependent, do not change. The Bscale parameters (floating point numbers, between 0 and 2) should be programmed into the calibration memory space of each module (SW).
Note #2: Each vehicle platform will have a set of 4 fixed "desired" pulse-echo response values, determined once.
Obtain second set of parameters - [a, b] (circuit board-transducer interaction dependent) (AE and/or AG):
Note #1: Each AOS module will have the same set of [a, b] parameters. as long as the same generation hardware (circuit board and transducers) are used during module assembly.
Note #2: the parameter set (a , b] should be programmed into the calibration memory space of each module (SW).
Compute the third set of parameters - [c] (module and transducer dependent) (AG):
    For module = 1 to N,
        For transducer = 1 to 4,
            c (module, transducer) = 1 - a * VMA (module,
                transducer)$^2$ - b * VMA (module, transducer)
        End
    End
Note #1: Each AOS module will have a set of 4 [ c ] parameters (one for each transducer); these values are determined once at calibration, and even though are module dependent, do not change. The [c] parameters (floating point numbers, between 0 and 100) should be programmed into the calibration memory space of each module (SW).
Note #2: Calibration stand data contains VMA (voltage monitor amplitude) information.
Program/"flash" each module with its corresponding values for Bscale. [c], and [a,b]. (AE and/or SW).
These steps conclude the module calibration procedure.

-continued

APPENDIX (Exhibits A–D)

Software Notes

Run-time ultrasound data calibration needs to be implemented through the following steps:
define enorm       ... /* TBD */
define a           ... /* TBD; hardware generation dependent*/
define b           ... /* TBD; hardware generation dependent*/
define c[..]       ... /* TBD; module and transducer dependent - calibration memory space*/
define Bscale[..] ... /* TBD; module and transducer dependent - calibration memory space
define maxs 2
define mins 0.5
i=1
Acquire Ultrasound RF-data for transducer i (usrfdata_i).
Baseband Ultrasound RF-data for transducer i usbbdata_i = bbt(usrfdata_i,50e3,156e3).
Compute voltage_monitor amplitude: VMA_i max_value (usbbdata_i(1:90)).
Compute scale factor s(i) = a*(VMA_i)2 + b*VMA_i + c(i).
        if s(i)>maxs, s(i)=maxs;
        if s(i)<mins, s(i)=mins;
Acquire temperature information and compute LNEW
Scale Baseband Ultrasound data for transducer i by Bscale(i): usbbdatas_i = usbbdata_i * Bscale(i).
Scale Baseband Ultrasound data for transducer i by s(i): usbbdatass_i = usbbdatas_i * s(i).
Scale Baseband Ultrasound data for transducer i by enorm: usbbdatasss_i = usbbdatass_i * enorm. Temperature -compensate Baseband Ultrasound data for transducer i (usbbdatasss_i).
Repeat for all other transducers...
(These steps complete the ultrasound pre-processing procedure.)
Note #1: All features and motion values need to be computed from usbbdatasss_i.
Note #2: All blocked values need to be computed from TBD.
Note #3: All diagnostic values need to be computed from TBD.

NOTICE: This correspondence chart or parts list is provided for informational purposes only. It is not a part of the official Patent Application, and is to be deleted at the time of issuance.

| | PARTS LIST |
|---|---|
| ADC | Analog-to-digital converter |
| $C_0$ | Transducer capacitance |
| $C_1$ | First VM capacitor |
| $C_2$ | Second VM capacitor |
| $Cc_1$ | First coupling capacitor |
| $Cc_2$ | Second coupling capacitor |
| Gd | Ground |
| MUX | 2 to 1 multiplexer |
| $R_1$ | First bias resistor |
| $R_2$ | Second bias resistor |
| T | Electrostatic US transducer |
| TCOMP | Compensated US input signal to AOS |
| USIN | Multiplexed signal |
| USOUT | US transducer signal voltage |
| USVMON | Voltage monitor output signal |
| $V_0$ | Supply Voltage |
| Vb | Bias Voltage |
| VM | Capacitive divider or voltage monitor |
| 1 | US compensation apparatus |
| 2a,b | Lines from T to MUX |
| 3a | Line from line 2 to $C_1$ |
| 3b,c | Lines from $C_1$ to $C_2$ |
| 3d | Line from $C_2$ to Gd |
| 6 | Line from MUX to ADC |
| 7 | Multiplexer control algorithm |
| 8 | Line from ADC to 10 |
| 10 | US echo signal compensation means |
| 11 | Line from 10 to 30 |

-continued

PARTS LIST

| | | |
|---|---|---|
| 15 | Calibration coefficients | |
| 20 | Conventional automotive occupancy system AOS Processor | |
| 30 | US feature extraction means | |
| 40 | Classification means | |
| 50 | Conventional airbag deployment system ADS | |
| 60 | Max value VMON for envelope | |
| 70 | Envelope | |
| 300 | Off-line temperature calibration | |
| 302 | Build N sample AOS units including temperature compensating apparatus of the invention | |
| 304 | Measure voltage monitor output (VMON) and echo amplitude (USIN) as a function of temperature for each unit for calibration temperature range (see FIGS. 6A and B). | |
| 306 | Compute a and b parameters for each unit (see Eq. 2) | |
| 303-311 | | |
| 307 | Calculate "standard" a and b as average of a and b values computed for sample units | |
| 308 | Store in Processor Unit | |
| 315 | Off-line "desired echo amplitude" selection | |
| 316 | Build M sample AOS units including temperature compensating apparatus of the invention | |
| 317 | Measure echo amplitude (USIN) at a standard temperature for each unit | |
| 318 | Calculate "standard" echo amplitude (USIN$_0$) as average of USIN values measured for M sample units | |
| 319 | Store in Processor Unit | |
| 320 | On-line hardware calibration | |
| 322 | Build production AOS unit including temperature compensating apparatus of the invention | |
| 324 | Measure voltage monitor output (VMON) and echo amplitude (USIN) for each transducer at room temperature | |
| 326 | Compute c and Bscale parameters for each transducer (see Eq. 3,5) | |
| 328 | Store a and b (pre-calibrated values), and c, and Bscale, (specific to unit/transducer), into AOS non-volatile memory | |
| 330 | Run-time echo signal compensation | |
| 332 | Install AOS unit including temperature compensating apparatus of the invention | |
| 334 | Measure voltage monitor output (VMON) for each transducer (see FIG. 5) | |
| 336 | Compute scaling factor Sglobal for each transducer from a, b and c and Bscale (see Eqs. 2,5) | |
| 338 | Scale US echo input signal USIN(t) for each transducer to yield compensated US echo signal TCOMP(t) (see Eq. 4) | |
| 340 | Transmit TCOMP(t) to conventional AOS feature extraction and occupancy classification means | |

What is claimed is:

1. In an ultrasound electrostatic transducer circuit for transmitting ultrasound pulses and receiving ultrasound echo returns, said transducer circuit producing an ultrasound transducer output signal in a ultrasound signal output line, a capacitive divider sub-circuit improvement comprising:
  (a) a first capacitor and a second capacitor electrically connected in series between said ultrasound signal output line and ground; and
  (b) a voltage signal output line electrically connected between said first and said second capacitor to produce a transducer voltage monitor output signal during transducer circuit operation.

2. A capacitive divider sub-circuit as in claim 1, wherein said voltage monitor output signal is used to measure the capacitance of said transducer.

3. A capacitive divider sub-circuit as in claim 1, wherein said voltage monitor output signal is used to measure the variation in the sensitivity of said transducer due to variation in the temperature of said transducer.

4. A capacitive divider sub-circuit as in claim 1, wherein said voltage monitor output signal is used to compensate for variation in the sensitivity of said transducer due to variation in the temperature of said transducer.

5. A capacitive divider sub-circuit as in claim 1, wherein:
  a) said ultrasound electrostatic transducer circuit is operated in communication with an ultrasound echo signal processing means into which said ultrasound output signal is input;
  b) said echo signal processing means has a maximum usable input signal magnitude; and
  c) the capacitances of said first and second capacitors are selected so that the magnitude of said voltage monitor output signal during said transmitted ultrasound pulses does not substantially exceed said maximum usable input signal magnitude.

6. A capacitive divider sub-circuit as in claim 5, wherein:
  a) said ultrasound echo signal processing means includes automotive occupancy sensing (AOS) electronics having an analog-to-digital converter for digitizing said ultrasound transducer output signal; and
  b) said analog-to-digital converter has a maximum digitizing level; and
  c) said maximum usable input signal magnitude is said maximum digitizing level.

7. An improved automotive occupancy sensor system having an ultrasound electrostatic transducer sensor circuit for transmitting ultrasound pulses and receiving ultrasound echo returns and an ultrasound signal output line for transmitting an ultrasound transducer output signal from said sensor circuit to a feature extraction means for extracting ultrasound echo return features for occupancy state classification, the improvement comprising:
  a) a voltage scaling sub-circuit connected to said transducer circuit to produce a voltage monitor signal in a voltage monitor signal line;
  b) a compensation means;
  c) said ultrasound signal output line and said voltage monitor signal line each connecting to and transmitting its respective signal to said compensation means;
  d) said compensation means scaling the amplitude of said ultrasound output signal in response to said voltage monitor signal to produce a scaled ultrasound output signal substantially compensated for the effects of variation in the temperature of said transducer; and
  e) said scaled ultrasound output signal being transmitted from said compensation means to said feature extraction means.

8. An improved automotive occupancy sensor system in claim 7, wherein said voltage monitor signal includes a scaled representation of said ultrasound transducer output signal during said ultrasound pulse transmission.

9. An improved automotive occupancy sensor system in claim 8, wherein:
  a) said voltage scaling sub-circuit includes a capacitive divider sub-circuit coupled to said transducer circuit to produce said voltage monitor signal; and
  b) said capacitive divider sub-circuit includes:
    i) a first capacitor and a second capacitor electrically connected in series between said ultrasound signal output line and ground, and
    ii) said voltage monitor signal line electrically connected between said first and said second capacitors to produce said voltage monitor signal.

10. An improved automotive occupancy sensor system as in claim 9, wherein:
  a) said ultrasound signal output line and said voltage monitor signal line are combined in a multiplexer to form a multiplex signal containing both ultrasound signal data and voltage monitor signal data;

b) said multiplex signal is transmitted to said compensation means; and c) said compensation means includes means for separately detecting and processing said ultrasound signal data and said voltage monitor signal data.

11. An improved automotive occupancy sensor system as in claim 10, wherein:

a) said automotive occupancy sensor system includes an analog-to-digital converter;

b) said multiplex signal is transmitted to said analog-to-digital converter and converted to a digital multiplex signal; and c) said digital multiplex signal is transmitted to said compensation means.

12. An improved automotive occupancy sensor system as in claim 11, wherein:

a) said analog-to-digital converter has a maximum digitizing level; and b) the capacitances of said first and second capacitors are selected so that the magnitude of said voltage monitor signal during said transmitted ultrasound pulses does not substantially exceed said maximum digitizing level.

13. An improved automotive occupancy sensor system as in claim 7, wherein said compensation means includes a computer usable medium having computer readable program code means embodied thereon for carrying out a compensation algorithm to scale the amplitude of said ultrasound signal output in response to said voltage monitor signal output.

14. A method of compensation for the effects of temperature-dependenlt variation in sensitivity of an ultrasound electrostatic transducer sensor circuit for transmitting ultrasound pulses and receiving ultrasound echo signals, comprising in any operative order:

a) providing a capacitive divider sub-circuit connected to said sensor circuit to produce a voltage output signal during said ultrasound pulse transmission;

b) measuring the amplitude of said voltage output signal of said capacitive divider sub-circuit; and c) scaling the amplitude of said ultrasound echo signal in response to said voltage output signal to produce a scaled ultrasound echo signal output substantially compensated for the effects of variation in the temperature of said transducer.

15. A method of compensation for the effects of temperature-dependent variation in sensitivity of an ultrasound electrostatic transducer circuit for transmitting ultrasound pulses and receiving ultrasound echo returns, said transducer circuit producing an ultrasound transducer output signal in a ultrasound signal output line, comprising in any operative order:

a) measuring the amplitude of said ultrasound transducer output signal during said transmitted ultrasound pulses; and b) scaling the amplitude of said ultrasound transducer output signal in response to said measured amplitude of said ultrasound transducer output signal to produce a scaled ultrasound transducer output signal that is substantially compensated for the effects of variation the sensitivity of said transducer due to variation in the temperature of said transducer circuit.

16. A method of compensation as in claim 15, wherein:

a) said measuring step includes measuring the amplitude of said ultrasound transducer output signal by means of a capacitive divider sub-circuit connected to said transducer circuit to produce a voltage monitor signal;

b) said voltage monitor signal includes a scaled transducer voltage signal during said ultrasound pulse transmission.

17. A method of compensation as in claim 16, comprising the steps of:

a) combining said voltage monitor signal and said ultrasound transducer output signal to produce a combined signal; said combined signal includes at least:
   i) voltage monitor signal information during said transmitted pulse; and
   ii) ultrasound transducer output signal information during said received ultrasound echo returns b) digitizing said combined signal to produce a digital combined signal c) separately detecting said voltage monitor signal information and said ultrasound transducer output signal information from said digital combined signal.

18. A method of compensation as in claim 17, wherein said combining step includes combining said signals by multiplex switching to produce a signal in which said voltage monitor signal information alternates with said ultrasound transducer output signal information.

* * * * *